(12) United States Patent
Osaki et al.

(10) Patent No.: US 6,285,541 B1
(45) Date of Patent: Sep. 4, 2001

(54) CAPACITOR INTEGRATED WITH CONNECTOR

(75) Inventors: Katsuhiro Osaki, Gotsu; Shigeyoshi Matsuoka, Matsue; Tsuyoshi Takashina, Katano, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/610,940

(22) Filed: Jul. 6, 2000

(30) Foreign Application Priority Data

Jul. 8, 1999 (JP) .................................................. 11-194014

(51) Int. Cl.[7] .............................. H01G 4/00; H01G 2/10
(52) U.S. Cl. ..................... 361/301.3; 361/517; 361/535
(58) Field of Search ........................... 361/301.3, 306.1, 361/309, 517–520, 535–538

(56) References Cited

U.S. PATENT DOCUMENTS

| 4,594,644 | * | 6/1986 | Painter | 361/807 |
| 5,771,149 | | 6/1998 | Osaki et al. | 361/306.1 |
| 5,978,203 | * | 11/1999 | Kiyomura et al. | 361/301.3 |
| 6,118,646 | * | 9/2000 | Yang et al. | 361/301.3 |

FOREIGN PATENT DOCUMENTS 3-187170 * 8/1991 (JP) .

* cited by examiner

*Primary Examiner*—Anthony Dinkins
(74) *Attorney, Agent, or Firm*—Parkhurst & Wendel, L.L.P.

(57) ABSTRACT

A capacitor integrated with connector having a capacitor element 11 from which at least two lead wires extend, a terminal board 10 having at least two connectors 13 and at least two connecting terminals 14, 15 electrically connected to each connector 13, respectively. A groove narrower than a lead wire 16 is formed in each of connecting terminals 14, 15, and a lead wire 16 is trapped in the groove. The capacitor integrating connector can be assembled with ease regardless of a shape of mounting board 4, and can substantially improve assembly efficiency and achieve lead-free connection.

12 Claims, 7 Drawing Sheets

CAPACITOR INTEGRATED WITH CONNECTOR

FIELD OF THE INVENTION

The invention relates to a capacitor integrated with a connector. More specifically, the invention relates to the capacitor integrating connectors that can be manufactured without soldering lead wires and mounted easily at desired position in a motor vehicle.

BACKGROUND OF THE INVENTION

From the viewpoint of electronization and safety for motor vehicles, a capacitor integrated with connectors, i.e. capacitor integrating connectors, such that a lead wire is kept out of sight is now in increasing demand. The capacitor integrating connectors has been principally used for prevention of noises generated in a motor vehicle.

Figure 9:
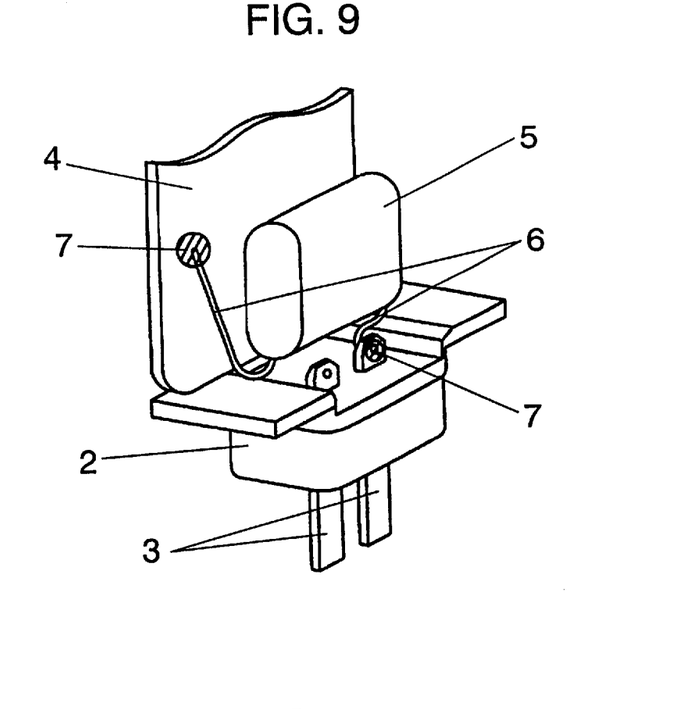
FIG. 9 is a perspective view showing a conventional integrated capacitor before it is housed in a case.
Figure 10:
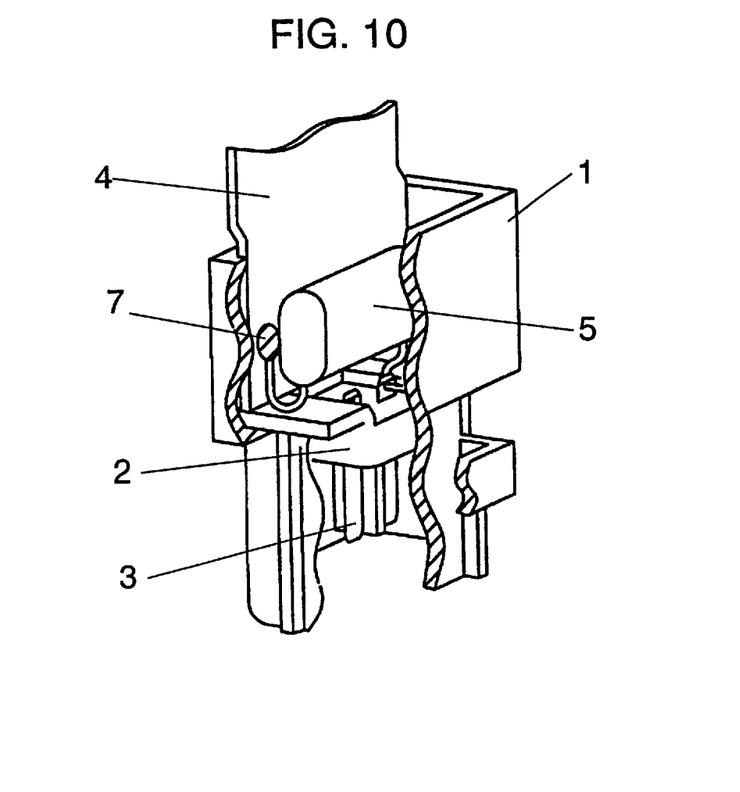
FIG. 10 is a partially cut-away perspective view of a conventional integrated capacitor after it is housed in a case.

The conventional capacitor integrating connectors, hereinafter "integrated capacitor," shown in FIGS. 7 to 10 is described hereinafter. As shown in FIG. 9, two connectors 3 extending downwardly from the integrated capacitor pass through terminal board 2, while two capacitor connecting sections 7 remain on the upper surface of terminal board 2. First lead wire 6 from capacitor element 5 is soldered to first capacitor connecting section 7. Mounting plate 4 made of metal is placed in proximity to capacitor element 5. The second lead wire 6 is soldered to the mounting plate 4. The terminal board 2 having capacitor element 5 and mounting plate 4 shown in FIG. 9 is housed in case 1 as shown in FIG. 10. Then, resin 8 is poured into an opening at the top of case 1 and is cured, so that the integrated capacitor is produced.

Connectors 3 of the integrated capacitor thus produced are connected to a circuit in a motor vehicle or car, and mounting plate 4 is fixed to the car body with bolts or the like to form an electric circuit. The integrated capacitor is generally mounted in the car after examining whether or not noises are generated. Therefore, the integrated capacitor is mounted at a later step in the process of car assembly. Since the integrated capacitor is mounted to the car after the car is almost completely assembled, mounting plate 4 has a complex shape because of limits on a mounting position. To increase noise preventive effects, the integrated capacitor is electrically coupled to the car body. In this case, as the integrated capacitor is also mounted at a later step in the process of car assembly, mounting plate 4 has a complex shape. Therefore, putting terminal board 2 carrying mounting plate 4 into case 1 takes time and substantial labor. Further, first capacitor connecting section 7 must be soldered to first lead wire 6, and mounting plate 4 must be soldered with second lead wire 6. Therefore, the integrated capacitor has a poor-workability problem when being assembled. Further, in recent years, according to environmental issues, removing lead contained in solder, that is, lead-free connection, is required. However, as described above, when assembling the integrated capacitor, soldering is inevitable because of the complex formation. Requirement on lead-free connection thus could not be addressed. Use of lead-free solder is one of various methods to achieve the lead-free connection, but lead-free solder capable of adapting to any environmental problem with high reliability is not yet available.

SUMMARY OF THE INVENTION

The purpose of the invention is to provide an integrated capacitor which can be easily assembled regardless of the shape of mounting plate 4. As a result, assembling efficiency of the integrated capacitor can be substantially improved, and lead-free connection free from soldering also can be achieved.

The integrated capacitor of the invention comprises, a capacitor element 11 with at least two lead wires and a terminal board 10 with at least two connecting terminals 14, 15 from which at least two connectors 13 extend downwardly and also two connecting terminals 14, 15 are electrically connected to each connector 13 respectively. Groove 20 narrower than lead wire 16 is fabricated in each connecting terminal 14, 15. Lead wire 16 is fitted and fixed in groove 20.

BRIEF DESCRIPTION OF THE DRAWINGS

FIG. 4 A is an upper plan view with lower side view showing lead wire fixing piece 19 which extends from connecting terminals 14, 15 between two slits 191, and lead wire 16 pushed into the groove 20.

DETAILED DESCRIPTION

The integrated capacitor of the present invention comprises capacitor element 11 having at least two lead wires and terminal board 10 having at least two connecting terminals 14, 15 and at least two connectors 13 which extend downwardly. The two connectors 14, 15 are electrically connected to two connecting terminals 14, 15 respectively. Each connecting terminal 14, 15 has groove 20 narrower than lead wire 16 and lead wires 16 are placed into and fixed in groove 20.

Figure 3:
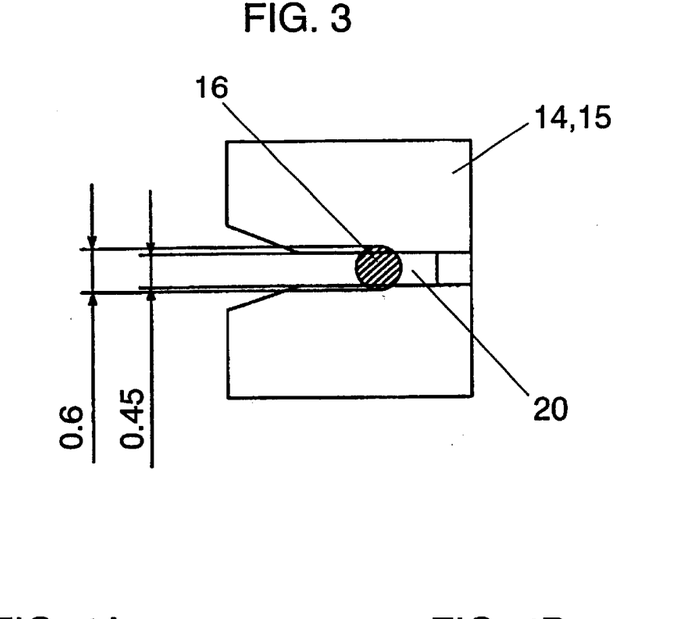
FIG. 3 is a plan view of one embodiment of the invention showing a comparison of a diameter of lead wire 16 with a width of groove 20 in connecting terminals 14, 15.

As shown in FIG. 3, it is preferable that groove 20 is not more than 90% as wide as lead wire 16. As shown in FIG. 4, lead wire fixing piece 19 extends into groove 20 from one end of groove 20 in each connecting terminal 14, 15 such that lead wire fixing piece 19 is between two slits 191. Lead wire fixing piece 19 is in contact with lead wire 16. It is preferable that lead wire 16 is fitted and fixed in groove 20. In this case, lead wire fixing piece 19 is elastic, and it is therefore preferable that this pressed-in lead wire fixing piece 19 pushes lead wire 16 in its return direction after the lead wire 16 presses lead wire fixing piece 19 and is fitted in groove 20

Figure 1:
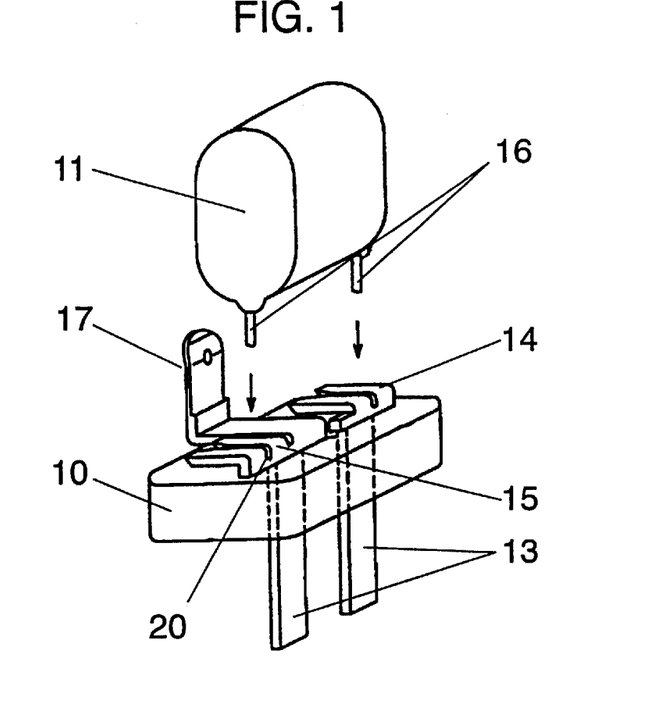
FIG. 1 is a perspective view showing capacitor element 11 being fitted in connecting terminals 14, 15 in a preferred embodiment of the invention.
Figure 2:
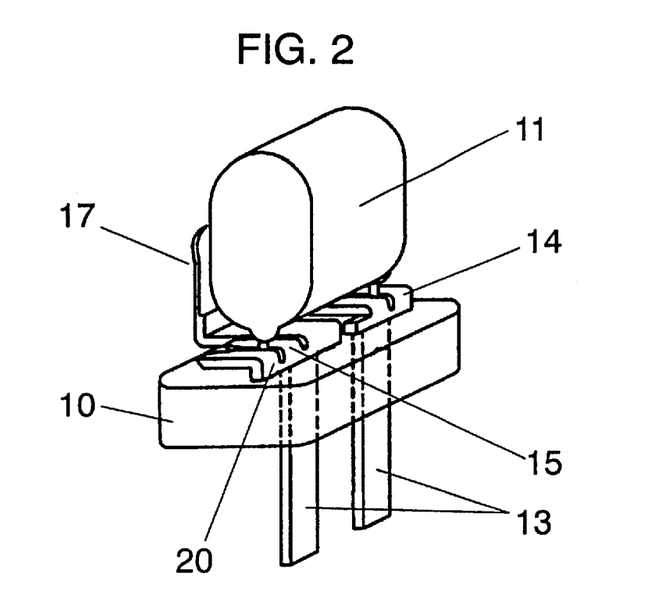
FIG. 2 is a perspective view showing capacitor element 11 fitted in connecting terminals 14, 15 in a preferred embodiment of the invention.
Figure 5:
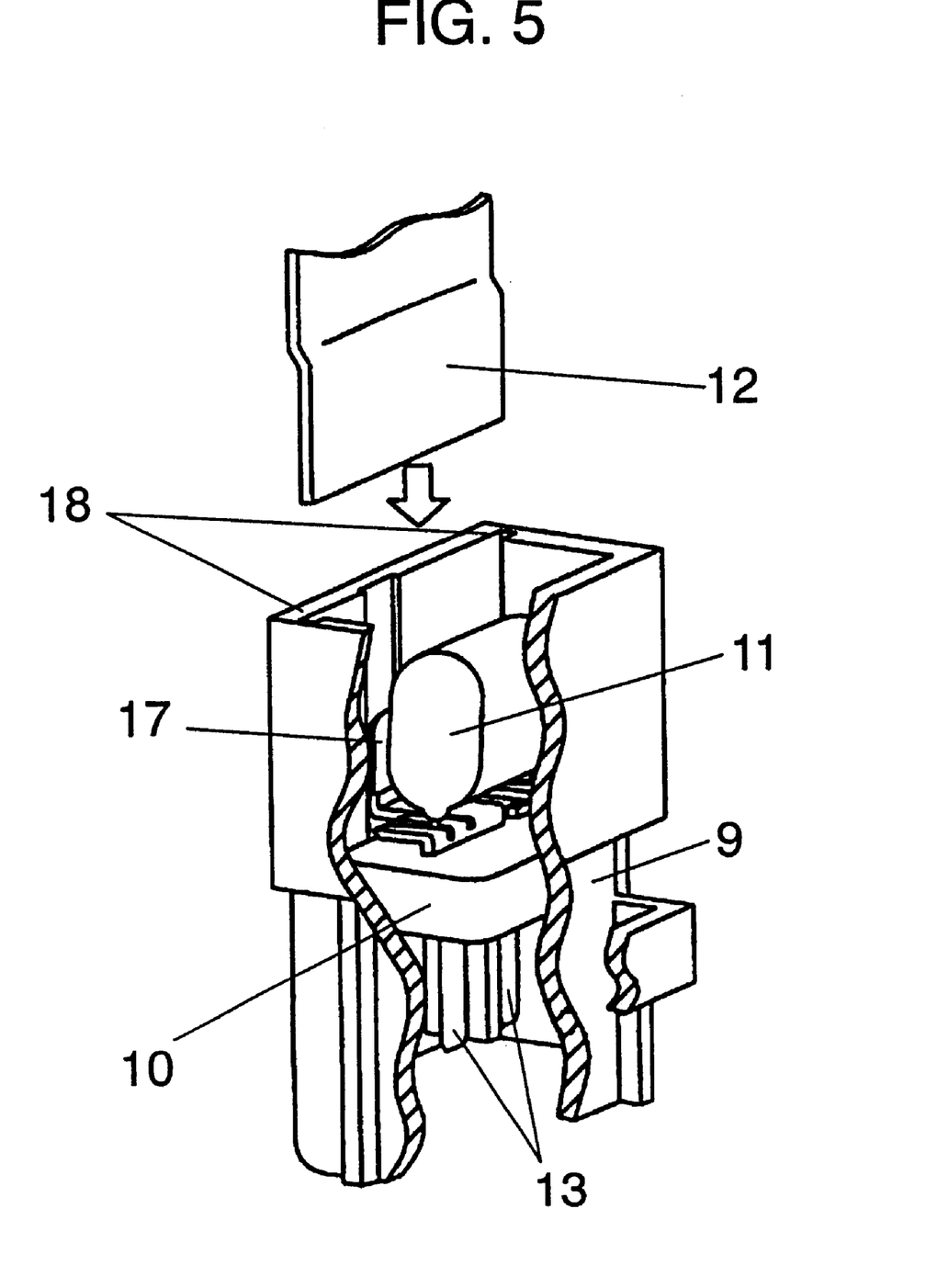
FIG. 5 is a partially cut-away perspective view of case 9 and mounting plate 12 being pushed therein.

In this embodiment, as shown in FIG. 1 and FIG. 2, contact terminal 17 extends upwardly from one end of at least one of connecting terminals 14, 15. As shown in FIG. 5, terminal board 10 is housed in case 9 so that the periphery of terminal board 10 is in contact with the inside wall of case 9. Capacitor element 11 is housed in the upper portion of case 9, and connecting terminals 13 are housed in the lower portion of case 9. Case 9 has an opening at the top. Mounting plate support section 18 is placed on the inside wall of case 9. And mounting plate 12 is held in mounting plate support section 18. It is preferable that contact terminal 17 be electrically connected to mounting plate 12. Furthermore, it is preferable that mounting plate support section 18 have a groove-shaped part provided on the inside wall of case 9.

It is preferable that contact terminal 17 is held between mounting plate 12 and case 9. It also is preferable that contact terminal 17 be a conductive plate and push mounting plate 12.

In one embodiment, a thickness of contact terminal 17 is 130 percent or more of a distance between mounting plate 12 and case 9. Resin is filled between terminal board 10 and the opening of case 9.

The invention is detailed with reference to FIGS. 1 to 6.

As shown in FIG. 1 and FIG. 2, two flat-plate connecting terminals 14, 15 are placed on the upper surface of terminal plate 10 in the integrated capacitor of the invention. Two connectors 13 extend downwardly through the terminal board 10 from each of the connecting terminals 14, 15.

On the other hand, two lead wires 16 extend downwardly from capacitor element 11. Connector 13 is shown in FIG. 1 and FIG. 2 as a flat plate, but it may be a cylinder or a polygonal pillar.

Grooves 20 are provided on the two connecting terminals 14, 15, respectively, in a horizontal direction in FIG. 1. This groove 20 is made to be narrower than lead wire 16. In the drawing, grooves 20 are drawn in a horizontal direction on the paper, but as described below, grooves 20 may be made in a front to back direction in the drawing if lead wire 16 mounted on the capacitor element 11 can be fitted in groove 20. A direction of groove 20 is not particularly limited. Furthermore, it is preferable to make the two lead wires the same width, but they may be of different widths. A width of groove 20 is adjusted optionally according to a width of the lead wire. As in the case of the lead wire, it is preferable to equate two connecting terminal 14, 15 in width, but different-wide connecting terminals may also be used.

As shown in FIG. 1, capacitor element 11 is brought into terminal board 10 from the top, and its lead wires are fitted into two grooves 20 on two connecting terminal 14, 15, respectively. Since groove 20 is narrower than lead wire 16, lead wires 16 are fixed in connecting terminals 14, 15, respectively, such that lead wires 16 are held in groove 20.

By fitting lead wire 16 in groove 20 on two connecting terminals 14, 15, capacitor element 11 can be fixed with terminal board 10 without soldering. Capacitor element 11 can be fixed and electrically connected to terminal board 10 simply by pushing capacitor element 11 from the top. This allows soldering to be eliminated and can improve integrated capacitor assemble efficiency.

Since capacitor element 11 is fixed on terminal board 10 without soldering, lead-free connection can be achieved in assembly of the integrated capacitor.

To fix capacitor element 11 securely on terminal board 10, it is preferable that groove 20 be not more than 90% of lead wire 16 in width, preferably not more than 85% or less. Moreover, it is more preferable that groove 20 have a width of 65% or more, and 75% or less, than that of lead wire 16. For example, as shown in FIG. 3, lead wire 16 is about 0.6 mm. and groove 20 is about 0.45 mm in width or diameter.

The shape of lead wire 16 is not especially defined. But, to fit lead wire 16 easily into groove 20, it is preferable that its shape be cylindrical. For the purpose of fixing capacitor element 11 securely on terminal board 10 by increasing a contact surface between the inside wall of groove 20 and lead wire 16, the lead wire may preferably be of polygonal crosssection (square or rectangular cross-section be more preferable). To push smoothly lead wire 16 into groove 20, narrower than lead wire 16, it is preferable that the tip of lead wire 16 be rounded by R-chamfering, or narrowed.

Figure 4A:
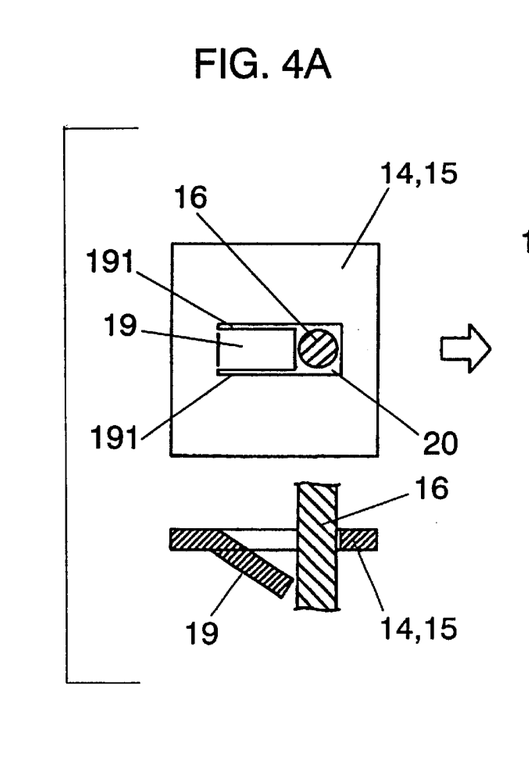
Figure 4B:
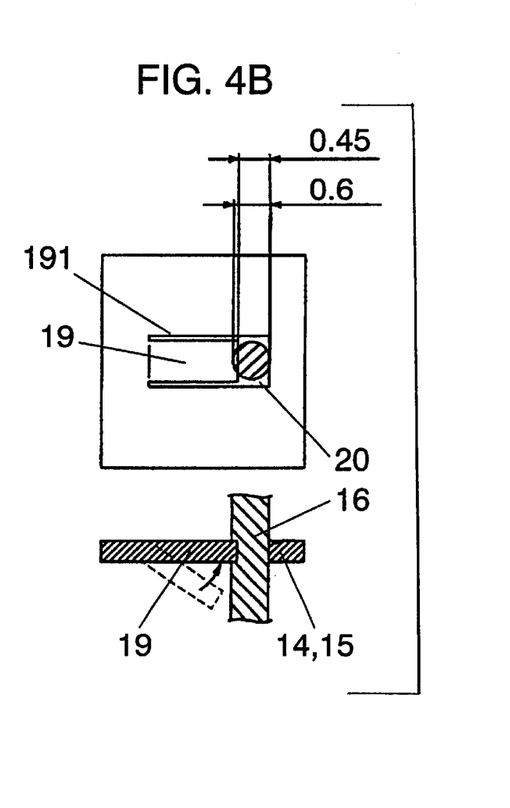
FIG. 4B is an upper plan view with lower side view showing the lead wire fixing piece 19 returned elastically and fixing lead wire 16.

As shown in FIG. 4, it is preferable that lead wire fixing piece 19 extend from one end of groove 20 in each connecting terminal 14, 15, such as being held between two slits 191. As shown in FIG. 4A, when lead wire 16 is pushed into groove 20 lead wire fixing piece 19 between two slits 191 extends from one end, and is pushed downwardly in FIGS. 4A, B. Simultaneously, lead wire 16 is fixed in groove 20. In the case of groove 20 shown in FIG. 3, it may be hard to push lead wire 16 into groove 20. However, when pushing lead wire 16 into groove 20 with lead wire fixing piece 19 shown in FIGS. 4A, B, simultaneously with pushing lead wire 16, lead wire fixing piece 19 is pushed downwardly as shown in FIG. 4A. Therefore, as compared with groove 20 shown in FIG. 3, the advantage of this structure is that lead wire 16 is easily pushed into groove 20 and workability can be improved. Moreover, in FIG. 4A, lead wire fixing piece 19 is out of contact with lead wire 16. But, lead wire 16 can be fixed in groove 20 by bringing lead wire fixing piece 19 into contact with lead wire 16 after lead wire 16 is pushed in.

Moreover, it is preferable to impart elasticity to lead wire fixing piece 19, to make pushed-in lead wire fixing piece 19 press lead wire 16 in an elastic return direction of lead wire fixing piece 19 as shown in FIG. 4B. When lead wire fixing piece 19 has no elasticity, lead wire fixing plate 19 remains deformed after it is pushed down. Therefore, lead wire 16 wobbles and may not be fixed securely in groove 20. However, as shown in FIG. 4B, if lead wire fixing piece 19 has elasticity, lead wire fixing piece 19 returns elastically after lead wire 16 is pushed into groove 20. As a result, lead wire fixing piece 19 is in contact with lead wire 16 and simultaneously can press lead wire 16. Therefore, lead wire 16 can be fixed securely in groove 20 and can also improve assembly efficiency.

As shown in FIG. 4B, examples of dimensions are as follows: Lead wire 16 is about 0.6 mm. wide. A part of the groove 20 into which lead wire fixing piece 19 does not extend, that is, at the point where lead wire 16 is pushed, is about 0.45 mm. wide. In the part without lead wire fixing piece 19 extending in groove 20, that is, a width of the groove in which lead wire 16 should be pushed, it is preferable that a width of groove 20 is not more than 90% of a width of lead wire 16. It is more preferable that the width is not more than about 85% of a width of lead wire 16. It is much more preferable that these two percentage values described above are 65% or more and 75% or less. FIG. 4B shows lead wire fixing piece 19 elastically returned completely. But lead wire fixing piece 19 does not necessarily return completely.

As shown in FIG. 1 and FIG. 2, in this embodiment of the integrated capacitor, contact terminal 17 extends upwardly from one end of at least one of two connecting terminals 14, 15. As shown in FIG. 5, after capacitor element 11 is placed on terminal board 10, terminal board 10 having contact terminal 17 is housed in case 9. Terminal board 10 housed in case 9 makes contact with the inside wall of case 9 on the side of terminal board 10, and case 9 houses capacitor element 11 in its upper portion, and connecting terminals 13 in its lower portion. A pair of groove-shaped mounting plate support sections 18 is formed opposed to each other on the inside wall of case 9. After terminal board 10 is housed in case 9, mounting plate 12 is pushed into this groove-shaped mounting-plate-support-section 18 from the top and is held in groove-shaped mounting-plate-support-section 18. Therefore, contact terminal 17 is securely electrically connected to mounting plate 12.

Figure 6:
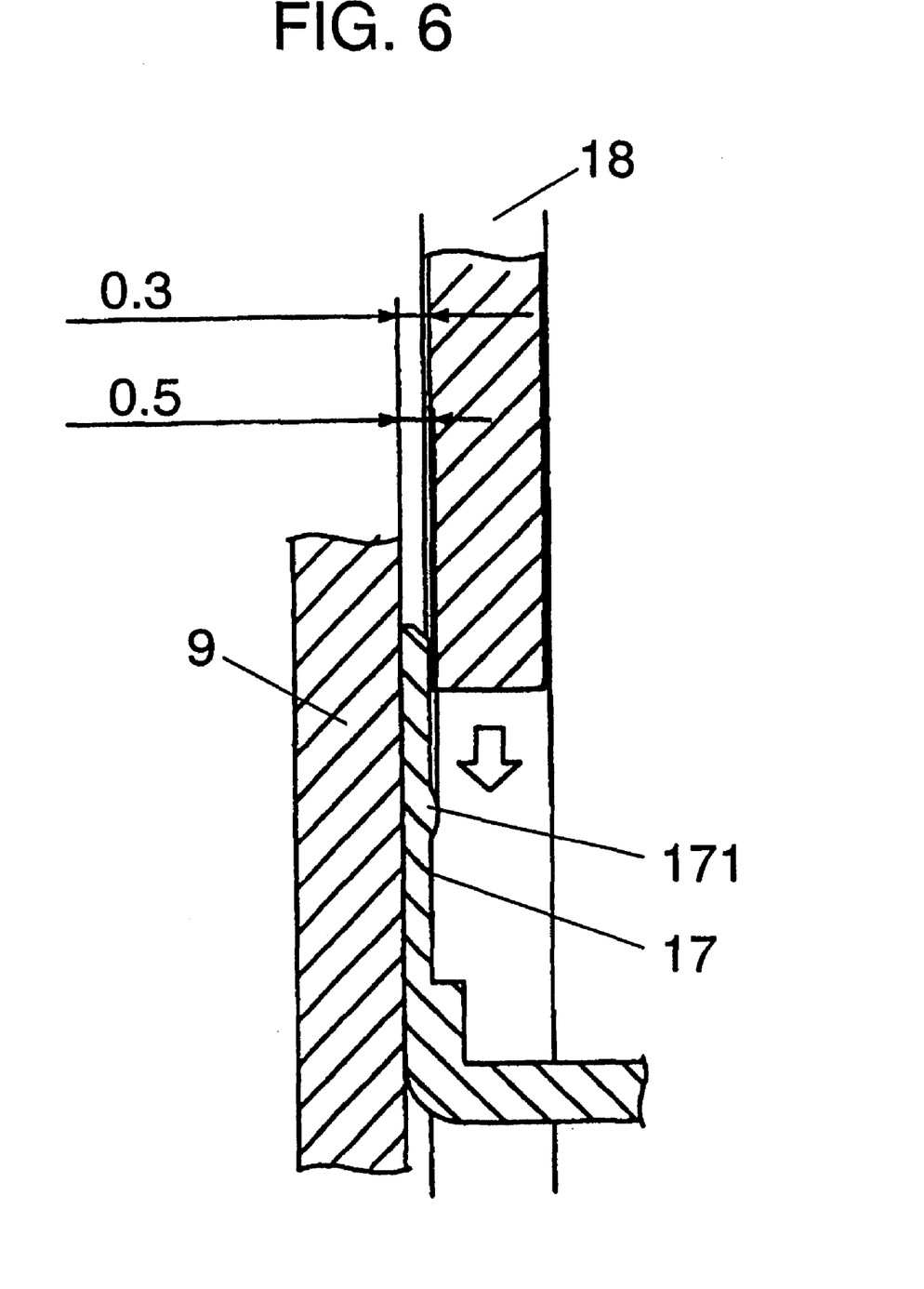
FIG. 6 is an enlarged cross-sectional view showing the locations of each of case 9, contact terminal 17 and mounting plate 12.
Figure 7:
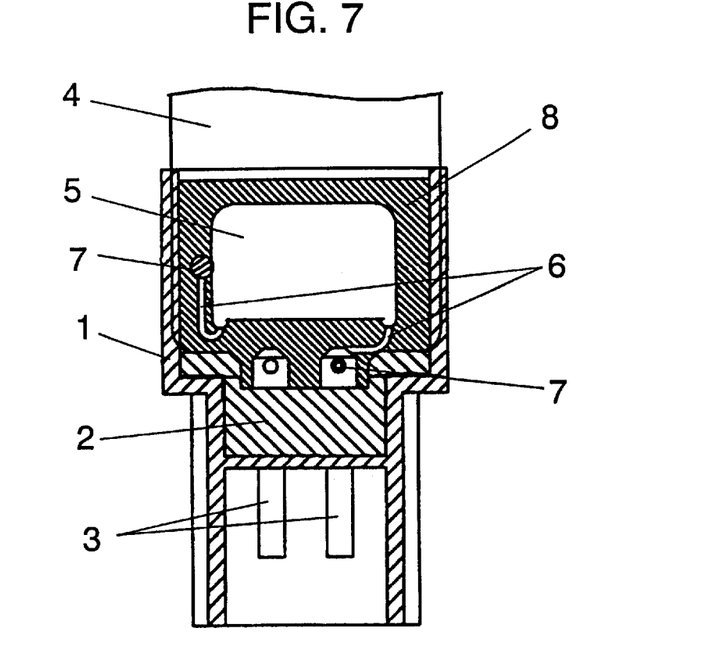
FIG. 7 is a front sectional view of a conventional integrated capacitor.
Figure 8:
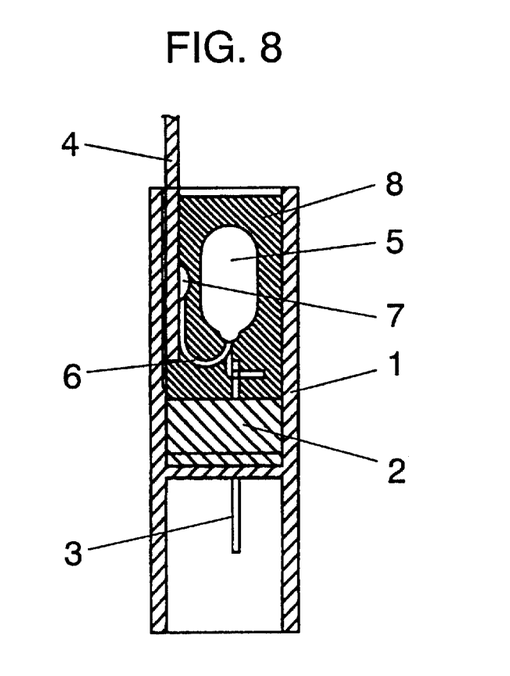
FIG. 8 is a side cross-sectional view of a conventional integrated capacitor.

Here each location of case 9, contact terminal 17 and mounting plate 12 is described hereinafter. As shown in FIG. 6, contact terminal 17 is held between case 9 and mounting plate 12. That is, when mounting plate 12 is pushed into the groove-shaped mounting plate support section 18 from the top, contact terminal 17 is pushed in between case 9 and mounting plate 12. It is preferable that contact terminal 17 is chamfered at the top to be pushed in smoothly as shown in FIG. 6. Thus, contact terminal 17 makes contact with mounting plate 12 by camber pressure of case 9 generated from holding contact terminal 17 between case 9 and mounting plate 12. It is preferable that a thickness of contact terminal 17 be not less than 130% of a distance between mounting plate 12 and case 9 to bring contact terminal 17 into contact with mounting plate 12. It is more preferable that a thickness of contact terminal 17 be not less than 150% of a distance between mounting board 12 and case 9.

Further, an elastic member, such as a metal plate, is used for contact terminal 17. Contact terminal 17 is tilted slightly toward the right in FIG. 6 before mounting plate 12 is pushed in. This tilted contact terminal 17 is pushed back to the left in FIG. 6 after mounting plate 12 is pushed in, and contact terminal 17 presses mounting plate 12. In the case where contact terminal 17 is a metal plate, both conductivity and elasticity can be provided.

By the pressing described above, terminal board 10 is not only more securely fixed in case 9 but also contact terminal 17 can be more securely electrically connected to mounting plate 12. As shown in FIG. 6, by placing a protrusion or rib 171 on flat-plate contact terminal 17, the pressing power is raised and contact terminal 17 is electrically connected to mounting plate 12 more securely. One example, as shown in FIG. 6, of the maximum thickness of the contact terminal 17 is, a thickness of the part upon which protrusion or rib 171 is placed on contact terminal 17, is 0.5 mm. As a thickness of the other parts thereof is 0.3 mm, the part with a protrusion or rib is 0.2 mm thicker than a part without such a protrusion or rib.

Figure 11:
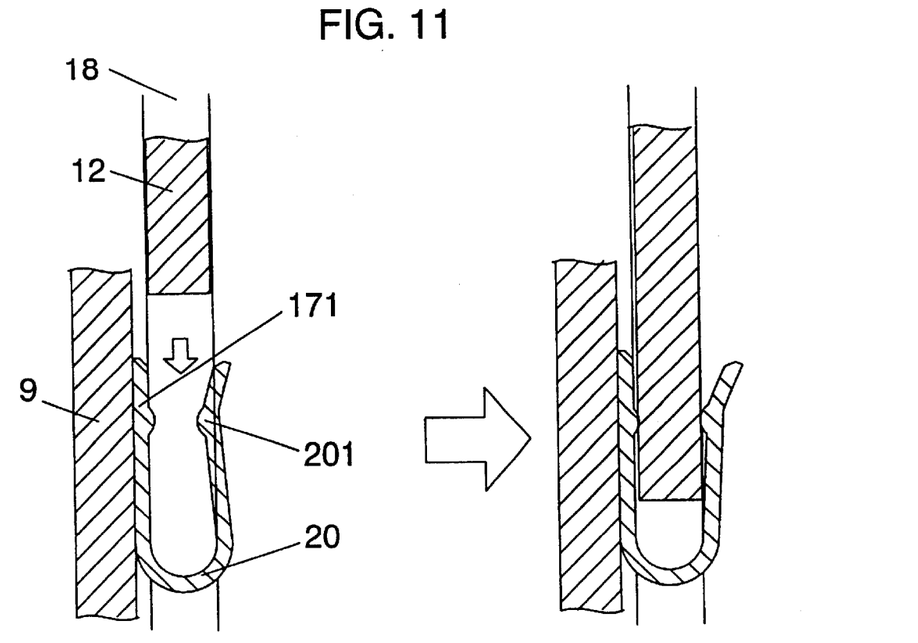
FIG. 11 is a cross-sectional view showing structure of a contact terminal having two protrusions or ribs on the opposite sides.
Figure 12:
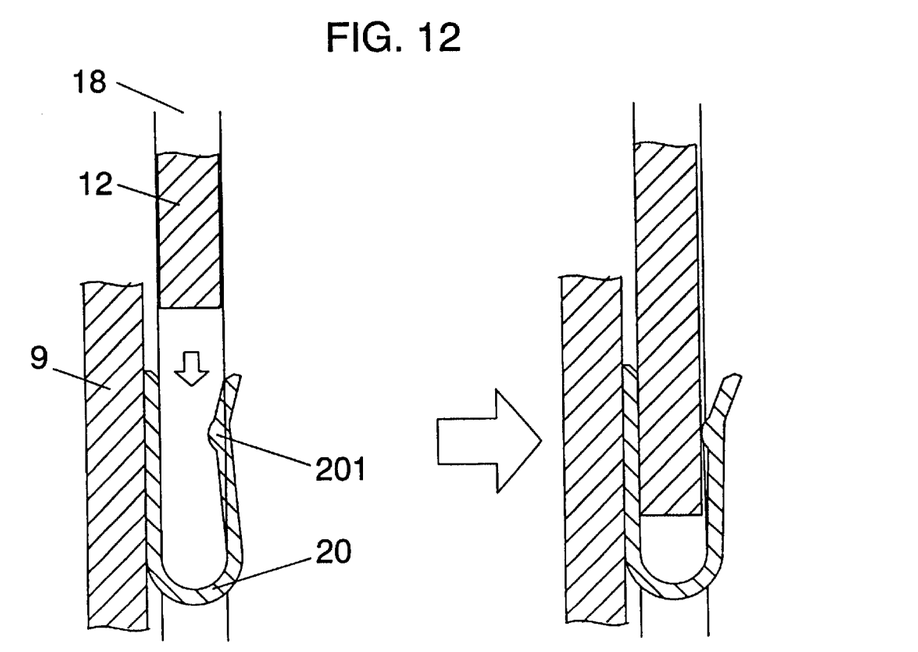
FIG. 12 is a cross-sectional view showing structure of a contact terminal having a protrusion or rib only on one side.

U-shaped contact terminal 20 may be used for a contact terminal as shown in FIGS. 11, 12. In this case, mounting plate 12 can be pressed from both sides. Therefore, even when resin expands or shrinks by temperature changes or otherwise after filling resin in the case, a steady electrical connection can be provided.

FIG. 11 shows mounting plate 12 facing protrusions or ribs 171, 201 on both sides of mounting plate 12. FIG. 12 shows mounting plate 12 facing protrusion 201 with only one side.

In the U-shaped contact terminal described above, it is preferable that a distance between both faces be designed to be less than a thickness of mounting plate 12, and a force which with which the contact terminal presses the mounting board is preferably at a value higher than 1.5 Kg.

Mounting plate 12 is pushed into groove-shaped mounting plate support section 18 and held, and then, resin is poured into case 9 through the opening at the top of case 9 and is cured. The resin is filled between the opening of case 9 and terminal board 10. Epoxy resin, urethane resin or others can be used for the resin. This resin filling can make terminal board 10 and contact terminals 14, 15 waterproof.

The integrated capacitor of the invention produced in a process described above is mainly connected to a circuit in a motor vehicle. Especially, when mounting plate 12 electrically connected to contact terminal 17 is a conductive plate, such as metal plate, and a connecting terminal is placed in the upper portion of the integrated capacitor, mounting plate 12 is connected to the car body and fixed. Then, connector terminals 13, which extend downwardly from the integrated capacitor, are connected to a circuit in the car.

As compared with a conventional integrated capacitor, in the present invention, mounting plate 12 is pushed into case 9 after terminal board 10 is housed in case 9. Therefore, when terminal board 10 is housed in case 9, it is not necessary to push mounting plate 4 and terminal board 10 into case 9 simultaneously. As a result, capacitor assembly efficiency can be improved.

In the capacitor described above, contact terminal 17 extends upwardly from the upper end of connecting terminal 15. Instead, both connectors 13, which are connected to connecting terminals 14, 15, may be connected to the circuit in the car without using contact terminal 17.

In the drawing, terminal board 10 is held horizontally. But terminal board 10 may be connected to capacitor element 11 diagonally or vertically.

As described above, in the integrated capacitor of the invention, groove 20, narrower than lead wire 16, is formed in each of connecting terminals 14, 15. Lead wire 16 is fitted and fixed in groove 20. As a result, capacitor element 11 is fixed to terminal board 10 without soldering, merely by pushing mechanically capacitor element 11 from the top, and capacitor assembly efficiency can be improved in the invention. Besides, a lead-free connection assembling the integrated capacitor can be achieved. When groove 20 is not more than 90% of lead wire 16 in width, the capacitor element 11 is securely fixed on terminal board 10. As shown in FIG. 4, when lead-wire fixing plate 19 extends from one end of groove 20, the improvement in operation for fixing lead wire 16 in groove 20 can be achieved. Furthermore, when using lead wire fixing piece 19 with elasticity, lead wire 16 can be securely fixed in groove 20 and assembly efficiency can be improved. Furthermore, in the invention, terminal board 10 is prevented from wobbling in case 9, and terminal board 10 is fixed in case 9 more securely by holding contact terminal 17 between the case 9 and the mounting plate 12 after pushing contact terminal 17. Especially, when a thickness of contact terminal 17 is maintained at a value not less than 130 percent of a distance between mounting board 12 and case 9, contact terminal 17 is fixed much more certainly. When terminal board 10 is housed in case 9, it is unnecessary to push mounting plate 12 and terminal board 10 into case 9 simultaneously. Therefore, assembly work becomes easy, and workability of capacitor assembly can be improved.

Contact terminal 17 is made of an elastic member such as a metal plate, and before mounting plate 12 is pushed, terminal contact 17 is tilted slightly to the right in FIG. 6 and then mounting plate 12 is pushed. In this case, contact terminal 17 is pushed back to the left in FIG. 6 and presses mounting plate 12. By this construction, terminal board 10 can be not only fixed more certainly, but also contact terminal 17 can be electrically connected to mounting plate 12 more securely. This is one method by which contact terminal 17 presses mounting plate 12. Other methods to press mounting plate 12 are also considered. For example, placing protrusion 171 on contact terminal 17.

Finally, terminal board 10 and contact terminals 14, 15 can be made waterproof by filling resin between the opening of case 9 and terminal board 10.

What is claimed is:

1. A capacitor integrated with connector, comprising:

a capacitor element (11) having at least two lead wires (16)

a terminal board (10) having at least two connecting terminals (14, 15) electrically connected to at least two connectors (13) respectively, wherein a groove (20) narrower than said lead wires (16) is present in each of said connecting terminals (14, 15), and one of said lead wires (16) is trapped in one of said grooves (20).

2. The capacitor of claim 1 wherein the groove (20) is not wider than 90% of the lead wire (16) width.

3. The capacitor of claim 1, wherein at least one of said connecting terminals (14, 15) has a lead wire fixing piece (19) in contact with a lead wire (16) and trapping said lead wire (16) in said groove (20).

4. The capacitor of claim 3, wherein said lead wire fixing piece (19) has elasticity, said lead wire fixing piece (19) presses said lead wire (16) in said groove (20).

5. The capacitor of claim 1 further comprising a contact terminal (17) extending from one end of at least one of said connecting terminals (14, 15).

6. The capacitor of claim 5, further comprising:

a case (9) in which a terminal board (10) is housed, a mounting plate support section (18) in said case (9), and a mounting plate (12) held in said mounting plate support section (18) and supporting said contact terminal (17).

7. The capacitor of claim 6, wherein said contact terminal (17) is electrically connected to said mounting plate (12).

8. The capacitor of claim 6, wherein said mounting plate support section (18) has a groove in the inside wall of said case (9).

9. The capacitor of claim 6, wherein said contact terminal (17) is held between said mounting plate (12) and said case (9).

10. The capacitor of claim 9, wherein said contact terminal (17) is a conductive plate which presses said mounting plate (12).

11. The capacitor of claim 9, wherein a thickness of said contact terminal (17) is not less than 130% of a distance between said mounting plate (12) and said case (9).

12. The capacitor of claim 6 wherein a resin fills the inside of said case (9).

* * * * *